United States Patent [19]

Azusawa

[11] 4,271,385
[45] Jun. 2, 1981

[54] CONTROL SYSTEM FOR COMMUTATORLESS MOTOR

[75] Inventor: Noboru Azusawa, Hitachi, Japan

[73] Assignee: Hitachi, Ltd., Tokyo, Japan

[21] Appl. No.: 935,596

[22] Filed: Aug. 21, 1978

[30] Foreign Application Priority Data

Aug. 22, 1977 [JP] Japan .................... 52-99569

[51] Int. Cl.³ ............................................. H02P 5/16
[52] U.S. Cl. ..................................... 318/722; 318/756
[58] Field of Search ............... 318/298, 299, 800, 801, 318/802, 803, 254, 720, 721, 722, 723, 724, 739, 740, 741, 756

[56] References Cited
U.S. PATENT DOCUMENTS

| 3,737,747 | 6/1973 | Krauer | 318/721 |
|---|---|---|---|
| 3,778,691 | 12/1973 | Poppinger et al. | 318/254 |
| 3,908,130 | 9/1975 | Lefuze | 318/800 |
| 4,085,355 | 4/1978 | Fradella | 318/721 |
| 4,132,931 | 1/1979 | Okuyama et al. | 318/799 |
| 4,144,559 | 3/1979 | Okuyama et al. | 318/800 |

Primary Examiner—Gene Z. Rubinson
Attorney, Agent, or Firm—Craig & Antonelli

[57] ABSTRACT

A synchronous motor having a polyphase armature winding and a field winding is driven by a frequency converter. A position signal associated with the rotational position of the synchronous motor is adapted to be shifted in phase by the maximum of 180° to the advance and lag side by a position control signal, so that a firing pulse for the frequency converter is generated by a combination of a phase-shifted position signal and a reverse signal. Thus the operation modes are switched stably between motoring and regenerative and between forward and reverse operations by changing the magnitude of the phase control signal and reversing the polarity thereof.

7 Claims, 14 Drawing Figures

CONTROL SYSTEM FOR COMMUTATORLESS MOTOR

BACKGROUND OF THE INVENTION

1. Field of the Invention

The present invention relates to a control system for a commutatorless motor, in which a synchronous motor is driven by a frequency converter comprising thyristors, or more in particular to a control sytem for a commutatorless motor, which is capable of stable change-over between motoring operation and regenerative operation and between forward operation and reverse operation.

2. Description of the Prior Art

A commutatorless motor, as well known, is a variable speed motor which is a combination of a synchronous motor and a frequency converter comprising thyristors for controlling the motor and which has neither commutator nor brush. The commutatorless motor is advantageous in that it has a very wide range of controllable speeds and that its lack of commutator and brush facilitate maintenance and inspection.

In the commutatorless motor, the four-quadrant operation including forward motoring operation and regenerative operation and reversing motoring operation and regenerative operation is available by changing the firing angle on the motor side of the frequency converter. In such a commutatorless motor, the firing angle on the motor side (angle of advance) is required to be changed in accordance with the operating conditions. This is for the reason that at the time of starting the motor, the angle of advance is lessened in order to attain the maximum torque, while at the time of loaded operation, the angle of advance is required to be increased in accordance with the load current in order to prevent any commutation failure which in turn is attributable to lack of the margin angle of commutation.

The prior art for overcoming such a problem is disclosed, for example, in the U.S. Pat. No. 3,778,691 entitled "Control Circuit for an Electric Machine Having an Electronic Commutator." According to this U.S. Pat. No. 3,778,691, a fixed pulse is obtained through combination of three position signals with the width of 180 electrical degrees and phase difference of 120 degrees and inverse position signals resulting from inversion of the position signals. At the same time, a speed signal is integrated for a predetermined period associated with the combination of the postion signals, so that a phase-shifted pulse is produced by comparing the integrated speed signal with a phase control signal. The thyristors are fired by the fixed pulse or the phase-shifted pulse, whichever is produced earlier. This U.S. Pat. No. 3,778,691 enables the maximum torque to be achieved at the time of starting on the one hand and the commutation failure to be prevented on the other hand.

The phase rotation at the time of forward operation is reverse to that at the time of reversing operation, thus making it necessary to change the combination of the position signals. This switching operation is usually performed by selecting AND gates in response to a forward operation command signal and a reversing operation command signal. This switching operation is made under the condition that the motor speed is zero. However, whether the motor speed is zero or not cannot be strictly decided but with a certain margin. The result is that at the time of switching, an irregular firing pulse is generated, thus leading to a fault such as the short-circuiting of the power supply. Further, at the time of switching from forward to reversing operation, the forward rotation is undesirably accelerated again if the switching operation is carried out in the speed range of forward operation. As a result, stable change-over between forward and reversing operations is impossible according to U.S. Pat. No. 3,778.691.

SUMMARY OF THE INVENTION

An object of the present invention is to provide a control system for a commutatorless motor which is capable of stable switching of operation modes without changing the combination of the position signals.

According to the present invention, there is provided a control system for a commutatorless motor, in which the position signal is adapted to be shifted in phase by 180 degrees toward advance and lagging sides in accordance with a phase control signal, and by an appropriate combination of the shifted position signals, a firing pulse is produced.

DESCRIPTION OF THE PREFERRED EMBODIMENTS

Figure 1:
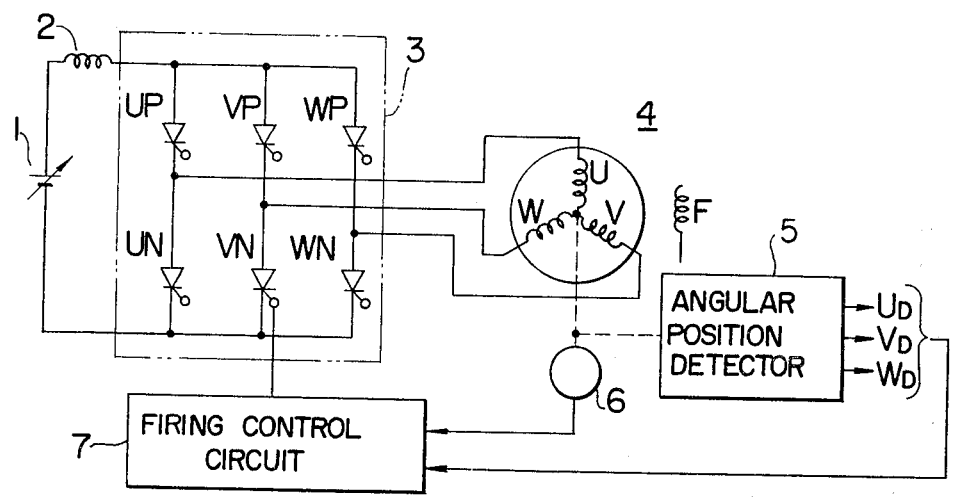
FIG. 1 is a diagram schematically showing the construction of the main circuit of the commutatorless motor.

FIG. 1 is a schematic diagram showing the main circuit of the control system for a commutatorless motor of DC link type.

In FIG. 1, reference numeral 1 shows a DC voltage source, numeral 2 a smoothing reactor, and numeral 3 an inverter circuit including Gratz-wired thyristors UP, UN, VP, ... WN for inverting a DC voltage into an AC voltage having a variable frequency. Numeral 4 shows a synchronous motor driven by the inverter 3, which includes polyphase armature winding U, V, W, and a field winding F. Numeral 5 shows an angular position detector coupled to the rotary shaft of the motor 4 for detecting the angular position of the rotor. The position detector 5 may alternatively take the form of a proximity switch for detecting the position of a protrusion coupled to the rotary shaft, a system in which a shutter is located intermediate between a light source and a light receiver to shut off the light by a shutter coupled to the rotary shaft, or a combination of a magnetism-sensitive element and a magnet coupled to the rotary shaft. The position signals $U_D$, $V_D$ and $W_D$ of the position detector 5 have a width of 180 electrical degrees and phase differences of 120 degrees therebetween. Numeral 6 shows a DC tachogenerator, and numeral 7 a firing control circuit for producing firing pulses for the thyristors UP, UN, ..., WN by a combination of position signals $U_D$, $V_D$, $W_D$ and the inverse position signals $U_{DN}$, $V_{DN}$, $W_{DN}$.

Figure 2:
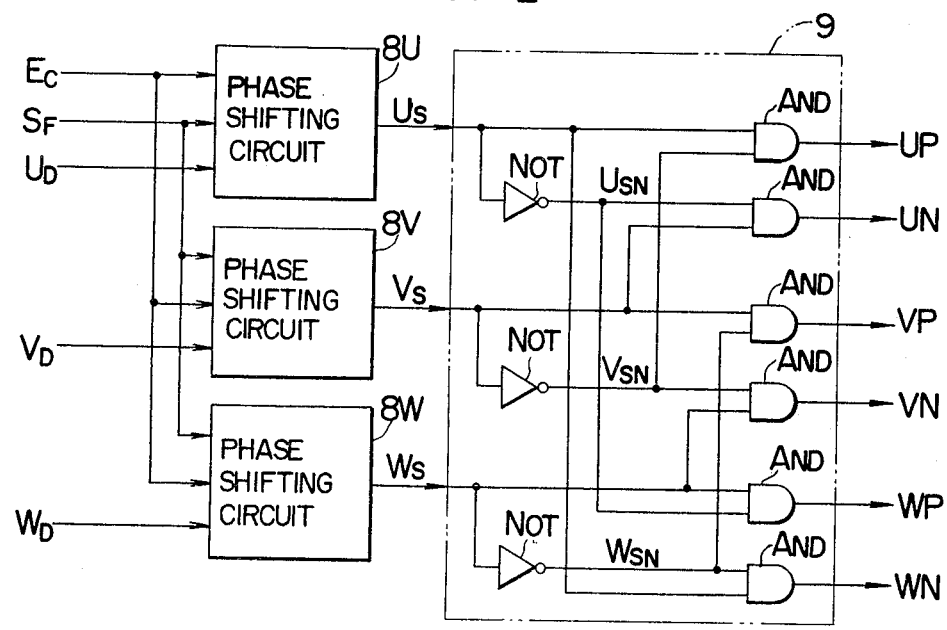
FIG. 2 is a diagram showing a construction of an embodiment of the control system according to the present invention.

The construction of the firing control circuit 7 is specifically shown in FIG. 2, in which 8U, 8V, 8W show phase-shifting circuits for producing phase shifted position signals $U_S$, $V_S$, $W_S$ which are obtained by shifting in phase the position signals $U_D$, $V_D$, $W_D$ in accordance with the phase control signal $E_C$ which may be generated manually or automatically and the speed signal $S_F$ of the tachogenerator 6, and numeral 9 a logic circuit including NOT circuits and AND circuits.

In this construction, the logic circuit 9 produces firing pulses UP, UN, ..., WN by use of the phase-shifted position signals $U_S$, $V_S$, $W_S$ and the reverse phase-shifted position signals $U_{SN}$, $V_{SN}$, $W_{SN}$ as follows:

$$UP = U_S \cdot V_{SN}, \quad VP = V_S \cdot W_{SN}, \quad WP = W_S \cdot U_{SN}$$

$$UN = U_{SN} \cdot V_S, \quad VN = V_{SN} \cdot W_S, \quad WN = W_{SN} \cdot U_S$$

Figure 3:
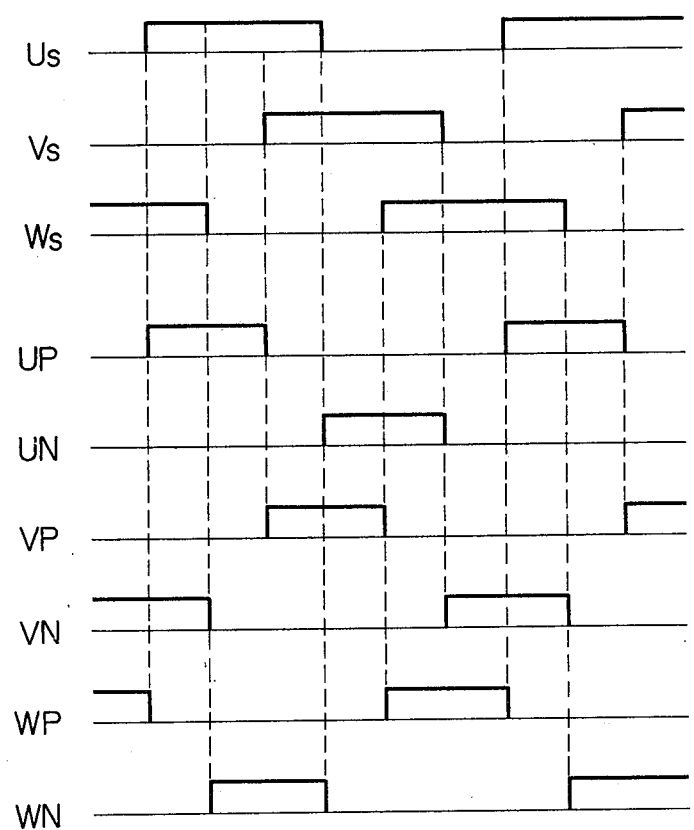
FIG. 3 is a time chart showing the operation of the logic circuit used in the embodiment of FIG. 2.

This is illustrated in FIG. 3.

Figure 4:
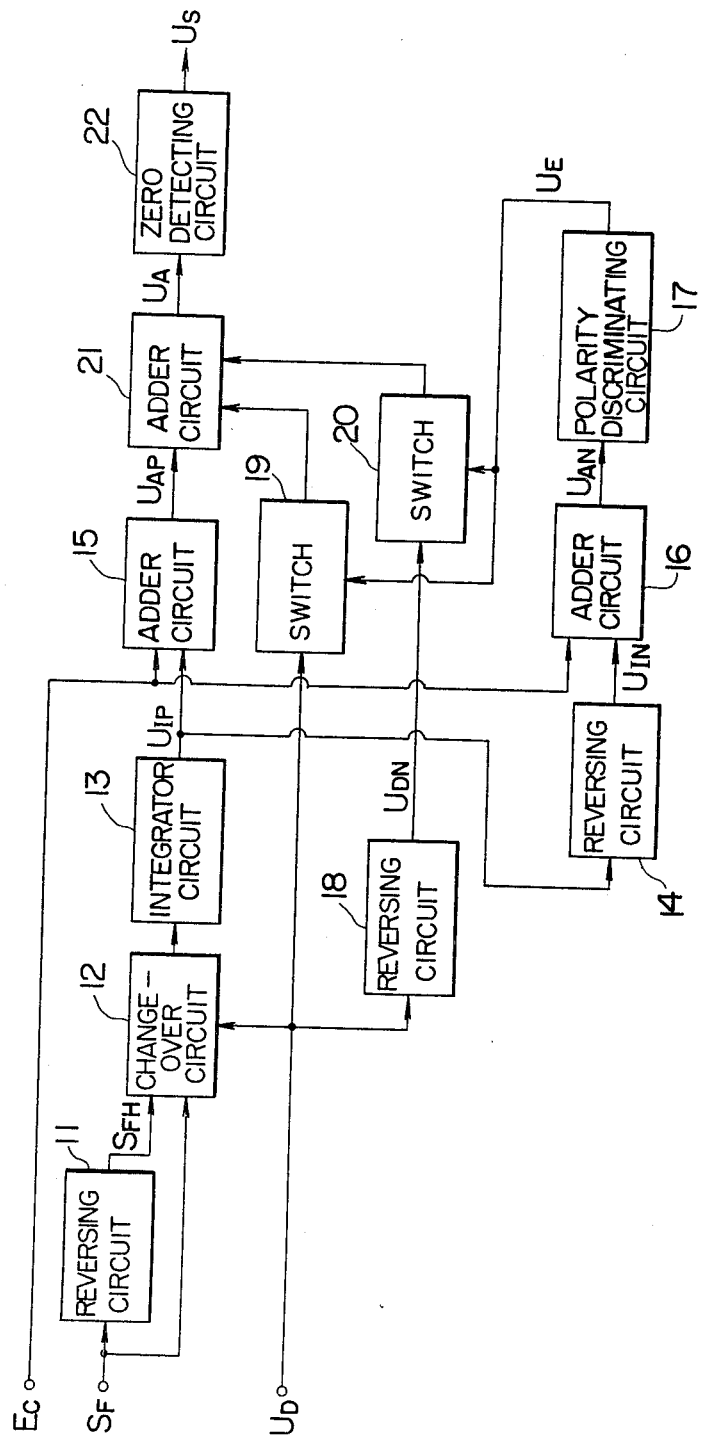
FIG. 4 is a diagram showing an example of a detailed construction of the phase-shifting circuit incorporated in FIG. 2.

A detailed construction of the phase-shifting circuit 8U of FIG. 2 is shown in FIG. 4. The phase-shifting circuits 8V and 8W have the same construction and therefore are not shown.

In FIG. 4, numeral 11 shows a reversing circuit for reversing the polarity of the speed signal $S_F$, numeral 12 a change-over circuit for switching between the speed signal $S_F$ and the reverse speed signal $S_{FN}$ for application to an integrator circuit 13 in response to the "1" or "0" state of the position signal $U_D$, numeral 13 the integrator circuit with positive and negative limiters for integrating the reverse speed signal $S_{FN}$ during the "1" state of the position signal $U_D$ and integrating the speed signal $S_F$ during the "0" state of the signal $U_D$. Numeral 14 shows a reversing circuit for reversing the polarity of the output signal of the integrator circuit 13, numeral 15 an adder circuit for adding the integrated signal $U_{IP}$ to the phase control signal $E_C$, numeral 16 an adder circuit for adding the reverse integrated signal $U_{IN}$ to the phase control signal $E_C$, numeral 17 a polarity-discriminating circuit for determining whether the adder signal $U_{AN}$ is positive or negative and producing an output signal $U_E$ in the state of "1" during the positive period of the signal $U_{AN}$. Numeral 18 shows a reversing circuit for reversing the polarity of the position signal $U_D$, numeral 19 a switch turned on to apply the position signal $U_D$ to the adder circuit 21 during the "0" state of the determination signal $U_E$, numeral 20 a switch turned on to apply the reverse position signal $U_{DN}$ to the adder circuit 21 during the "1" state of the determination signal $U_E$, numeral 21 an adder circuit for adding the added signal $U_{AP}$ of the adder circuit 15 to the position signal $U_D$ or the reverse position signal $U_{DN}$, and numeral 22 a zero-detecting circuit for maintaining the phase-shifted signal $U_S$ at "1" during the positive state of the added signal $U_A$ of the adder circuit 21.

The operation of this circuit will be explained below with reference to the time charts of FIGS. 5 to 8.

Figure 5:
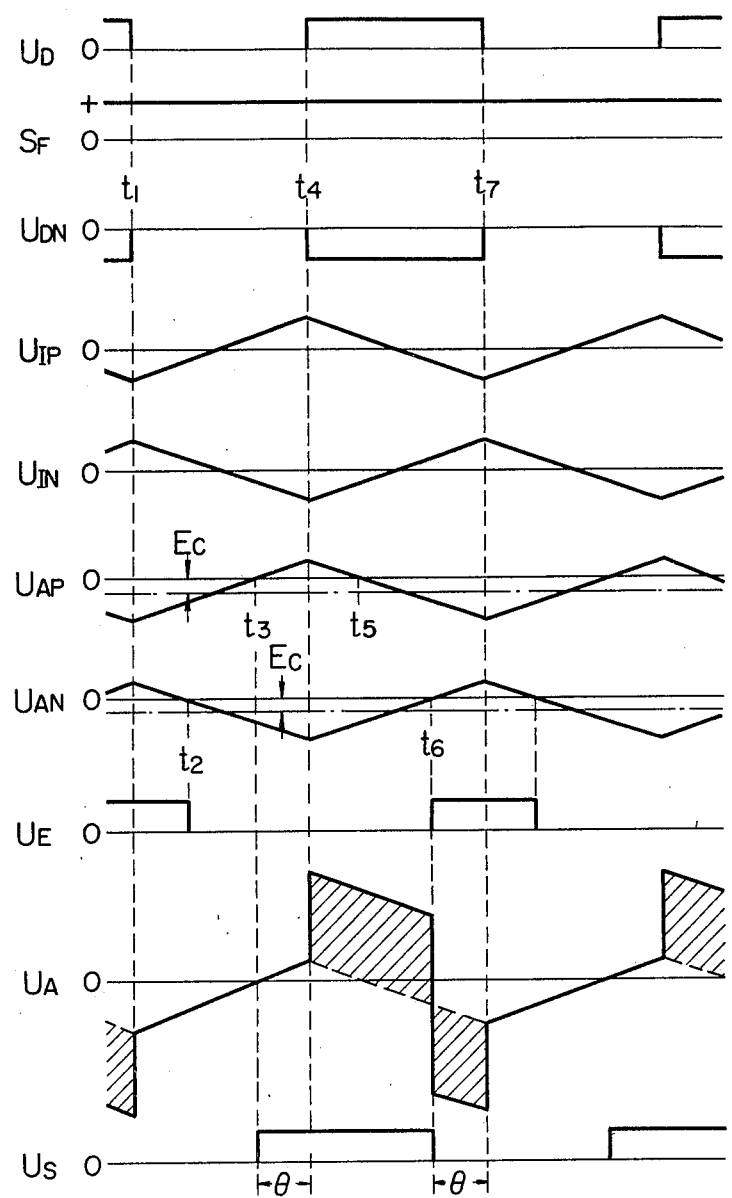
FIGS. 5 to 10 are time charts for explaining the operation of the phase-shifting circuit.

First, the forward operation will be explained with reference to FIG. 5. The speed signal $S_F$ detected by the tachogenerator 6 is applied to the integrator circuit 13 through the change-over circuit 12. The speed signal $S_F$ is also applied via the change-over circuit 12 to the integrator circuit 13 after being reversed in polarity by the reversing circuit 11. The change-over circuit 12, in response to the "0" or "1" state of the position signal $U_D$, selects the speed signal $S_F$ or the reverse speed signal $S_{FN}$ to be applied to the integrator circuit 13. Specifically, the reverse speed signal $S_{FN}$ is selected during "1" state of the signal $U_D$, and the speed signal $S_F$ selected during "0" state thereof. The integrated circuit 13 integrates the speed signal $S_F$ during the "0" state of the signal $U_D$, and therefore the integrated output $U_{IP}$ is increased in the positive direction during the period from $t_1$ to $t_4$. During the "1" state of the signal $U_D$, on the other hand, the reverse speed signal $S_{FN}$ is integrated and therefore the integrated signal $U_{IP}$ is increased in the negative direction for the period from $t_4$ to $t_7$. The integrator circuit 13 has positive and negative limiters so that the crest value of the integrated signal $U_{IP}$ is always kept at a constant limited value. The frequency of the position signal $U_D$ is proportional to the magnitude of the speed signal $S_F$. Therefore, by selecting the integration time constant of the integrator circuit 13 in such a manner that the crest value (absolute value) of the integrated signal $U_{IP}$ is equal to the limited value at the cycles for the rated speed, the integrated signal $U_{IP}$ becomes maximum at the time of change between "0" and "1" of the position signal $U_D$ and the direction of integration is reversed even if the speed of the synchronous motor 4 undergoes a change. As a result, the integrated signal $U_{IP}$ is a triangular signal with a constant peak-to-peak value synchronous with the position signal $U_D$. This integrated signal $U_{IP}$ is applied to the adder circuit 15 and, after being reversed in phase by the phase-reversing circuit 14, applied to the adder circuit 16 in the form of signal $U_{IN}$. In the adder circuits 15 and 16, the integrated signals $U_{IP}$ and $U_{IN}$ are added to the phase-control signal $E_C$, thus producing the signal $U_{AP}$ crossing the zero point at time points $t_3$ and $t_5$, and the signal $U_{AN}$ crossing the zero point at time points $t_2$ and $t_6$. Upon application of the output signal $U_{AN}$ of the adder circuit 16 to the polarity discriminating circuit 17, the signal $U_E$ which is in the state "1" only during the positive period of the signal $U_{AN}$ is produced. The signal $U_E$ determines the end and front of some of the firing pulses UP, UN, ..., WN. The switch 19 is turned on to apply the position signal $U_D$ to the adder circuit 21 when the signal $U_E$ is "0;" while the switch 20 is turned on to apply the reverse position signal $U_{DN}$ from the reversing circuit 18 to the adder circuit 21 when the signal $U_E$ is "1." The result is that the adder circuit 21 adds the position signal $U_D$ to the signal $U_{AP}$ during the period from $t_4$ to $t_6$, and the reverse position signal $U_{DN}$ to the signal $U_{AP}$ during the period from $t_6$ to $t_7$. The output signal $U_A$ thus produced from the adder circuit 21 is the result of dividing the signal $U_D$ by the phase control signal $E_C$ when the position signal $U_D$ is "1." By the way, the crest value of the position signal $U_D$ is set at a level higher than the amplitude of the triangular wave signal $U_{IP}$ in accordance with the phase control signal $E_C$. This is for the purpose of providing a positive period of the added signal $U_A$ at the maximum value of the phase control signal $E_C$. In the drawing under consideration, the signal $U_A$ has the portions of signal $U_D$ and $U_{DN}$ shown shadowed and enlarged. The zero-detecting circuit 22 is for changing the signal $U_S$ into "1" state during the positive period of signal $U_A$. This signal $U_S$ takes the form of a pulse with the width of 180 electrical degrees and is advanced in phase by $\theta$ from the position signal $U_D$. The phase angle θ is increased by enlarging the phase control signal $E_C$ in positive direction. Thus, by increasing the phase control signal $E_C$ in positive direction, the phase angle θ may be changed from 0 degree to the advanced 180 degrees.

Figure 6:
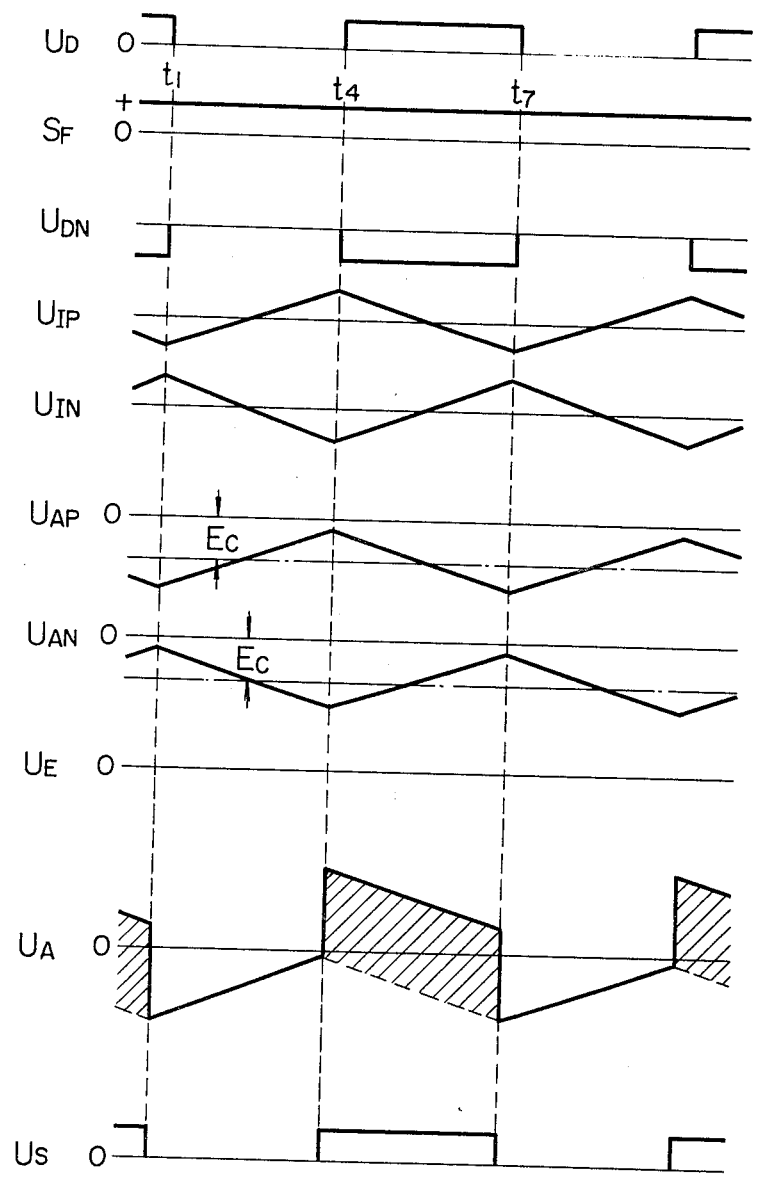

The phase angle θ may be adjusted by the phase control signal $E_C$. If the phase control signal $E_C$ is increased in negative direction more than the crest value of the integrated signal $U_{IP}$, however, the adder signals $U_{AP}$ and $U_{AN}$ of the adder circuits 15 and 16 are negative throughout the period from $t_1$ to $t_7$ corresponding to one cycle of the position signal $U_D$ as shown in FIG. 6. As a result, the output signal $U_E$ of the polarity discriminating circuit 17 also becomes "0." In this case, only the switch 19 is turned on so that the signal $U_{AP}$ is added to the signal $U_D$ at the adder circuit 21. The resulting added signal $U_A$ is positive only during the period from $t_4$ to $t_7$ corresponding to the "1" period of the position signal $U_D$ as shown in FIG. 6. Thus, the phase-shifted signal $U_S$ produced from the zero detecting circuit 22 is in phase with the position signal $U_D$.

Figure 7:
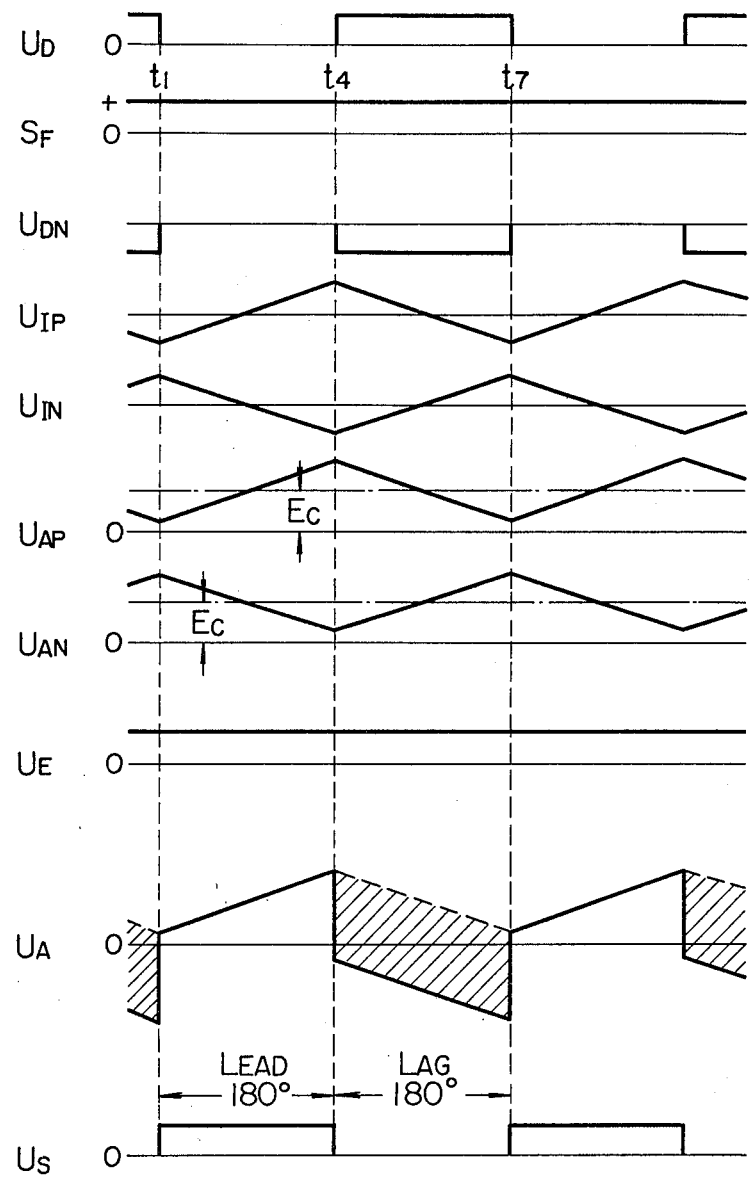

Increasing the phase control signal $E_C$ in the positive direction from the amplitude value of the integrated signal $U_{IP}$, the added signal $U_{AP}$ and $U_{AN}$ are positive throughout the whole period as shown in FIG. 7. The result is that the output signal $U_E$ of the polarity discriminating circuit 17 is kept always "1," while the adder circuit 21 adds the signal $U_{AP}$ to the reverse position signal $U_{DN}$. In this case, the added signal $U_A$ is positive during the period from $t_1$ to $t_4$, so that the phase-shifted position signal $U_S$ is advanced in phase by 180 degrees with respect to the positive signal $U_D$ as shown in FIG. 7.

In this way when the phase control signal $E_C$ is increased in positive direction the phase-shifted signal $U_S$ leads in phase the position signal $U_D$. When the phase control signal $E_C$ is increased in the negative direction, the phase difference is reduced to such an extent that the signal $U_S$ becomes in phase with signal $U_D$. Thus, it is possible to change the phase angle θ from zero degree to the advanced angle of 180 degrees.

The foregoing description is concerned with the operation of the phase-shifting ciruit 8U. The phase-shifting circuits 8V and 8W also produce the phase-shifted position signals $V_S$ and $W_S$ shifted in phase in accordance with the phase control signal $E_C$. Upon application of these phase-shifted position signals $U_S$, $V_S$ and $W_S$ to the logic circuit 9, the firing pulses UP, UN, . . . , WN through the combination mentioned above are generated.

Figure 8:
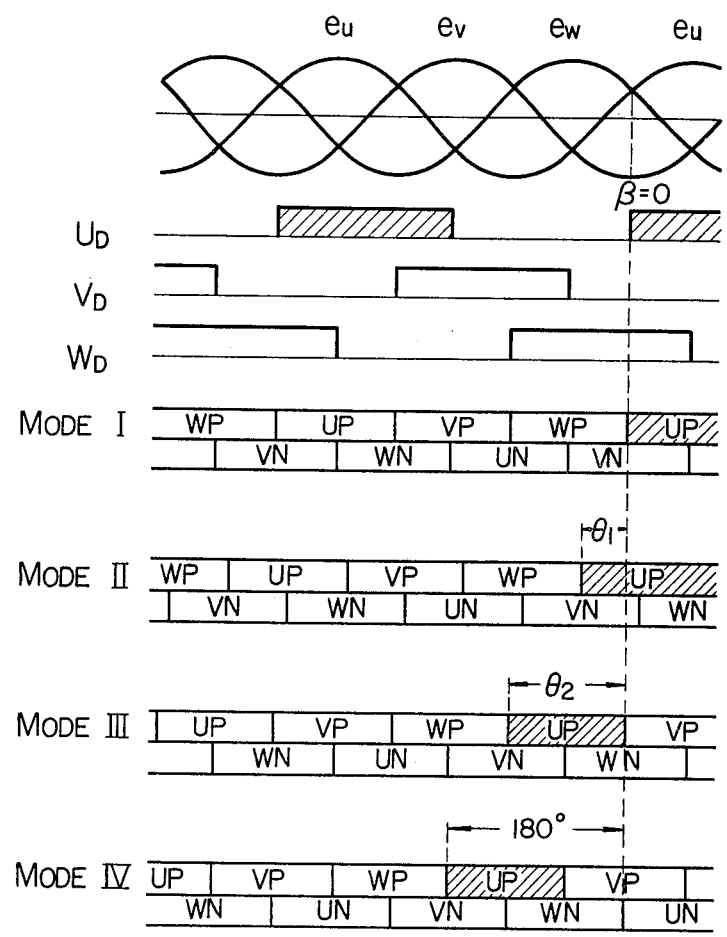

FIG. 8 shows the relation between the phase voltages eu, ev and ew of the synchronous motor 4 and the firing pulses UP, VP, . . . , WP, at the forward operation. The mode I is concerned with the low-speed motoring operation at the phase angle θ of 0 degree; the mode II is concerned with the high-speed motoring operation at the phase angle θ of 45 degrees; the mode III with the high-speed regenerative operation at the phase angle θ of 120 degrees; and the mode IV with the low-speed regenerative operation at the phase angle θ of 180 degrees. In this way, at the time of forward operation, the angle of advance is capable of being controlled as desired by changing the magnitude and the polarity of the phase control signal $E_C$, with the result that the motoring and regenerative operations are performed as desired by control of the angle of advance.

Figure 9:
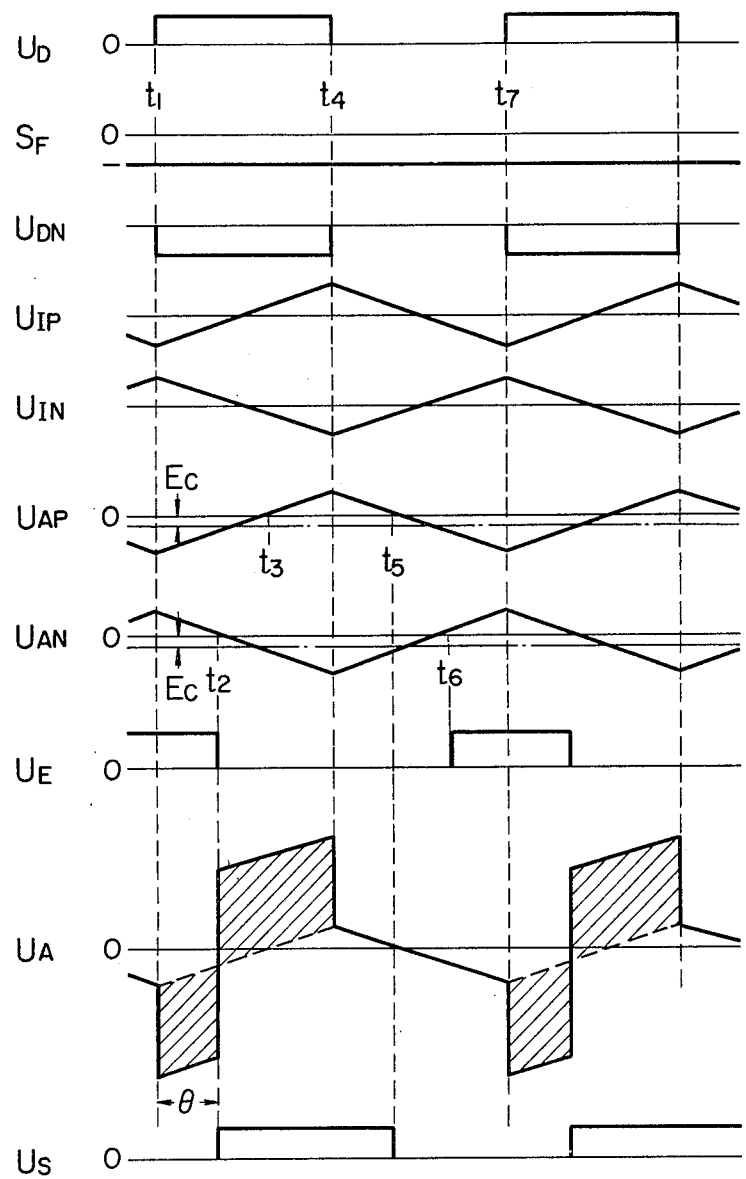

Next, the reversing operation will be explained with reference to FIG. 9.

In the case of the reversing operation, the speed signal $S_F$ of the DC tachogenerator 6 is reversed to negative in polarity. Therefore, the integrated signal $U_{IP}$ of the integrator circuit 13 takes the form of triangular signal which is increased in the positive direction during the "1" period of the position signal $U_D$ and increased in the negative direction during the "0" period thereof. In this case, if the phase control signal $E_C$ is set at a predetermined value in the positive direction, the added signal $U_{AN}$ of the adder circuit 16 is positive during the period from $t_1$ to $t_2$, and the signal $U_E$ is also "1" during the period from $t_1$ to $t_2$. During the period from $t_1$ to $t_2$, the switch 20 is thus turned on, so that the signal $U_{AP}$ is added to the reverse position signal $U_{DN}$ at the adder circuit 21. During the period from $t_2$ to $t_4$ when the signal $U_E$ is "0," on the other hand, the signal $U_A$ of the adder circuit 21 takes the form as shown in the drawing. The phase-shifted position signal $U_S$ obtained from the zero-detecting circuit 22 is delayed in phase by the phase angle θ. It is thus seen that during the reversing operation, too, the phase angle θ may be adjusted to the lag side by changing the phase control signal $E_C$. During the reversing operation, the phase angle θ may be increased to 180 degrees by increasing the phase control signal $E_C$ in positive direction more than the amplitude value of the integrated signal $U_{IP}$. Also, according as the phase control signal $E_C$ is increased in negative direction, the phase angle θ is lessened. When the phase control signal $E_C$ is increased in negative direction more than the amplitude value of the integrated signal $U_{IP}$, the phase angle θ reaches zero degree.

As noted from the foregoing description, even during the reversing operation, the phase-shifted position signal $U_S$ adapted to be shifted by 180 degrees with respect to the position signal $U_D$ is produced, while at the same time producing the phase-shifted position signals $V_S$ and $W_S$ from the similar phase-shifting circuits 8V and 8W. As a result, the firing pulses UP, UN, . . . WN obtained by combination of the phase-shifted position signals are also capable of being varied continuously in the range from 0 to 180 degrees in phase.

Figure 10:
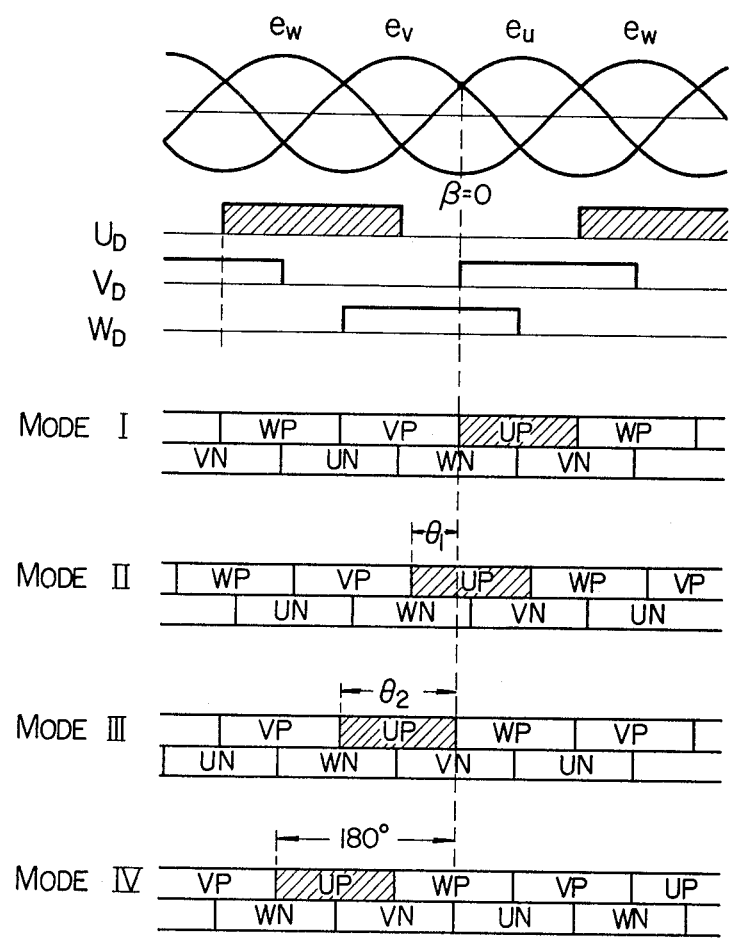

FIG. 10 shows the relation between the phase voltages eu, ev and ew of the synchronous motor 4 and the firing pulses UP, UN, . . . , WN, at the reversing operation. Mode I is concerned with the low-speed motoring operation at the phase angle θ of zero degree, i.e. at the angle of advance β of zero degree; mode II with the high-speed motoring operation at the angle of advance β of 60 degrees (θ=60°); mode III with the high-speed regenerative operation at the angle of advance β of 120 degrees (θ=120°); and mode IV with the low-speed regenerative operation at the angle of advance β of 180 degrees (θ=180°).

In this way, by changing the magnitude and polarity of the phase control signal $E_C$, the motoring and regenerative operations are switched to each other continuously even during the reversing operation.

The forward and reversing operations are explained above. During the forward operation, the phase angle θ, i.e., the angle of advance β may be changed from 0 to 180 degrees continuously by changing the phase control signal $E_C$ from negative to positive. During the reversing operation, on the other hand, by changing the phase control signal $E_C$ from positive to negative, the phase angle θ may be changed continuously from 180 to 0 degree of lag, or in other words, the angle of advance β may be shifted from 0 to 180 degrees.

Figure 11A:
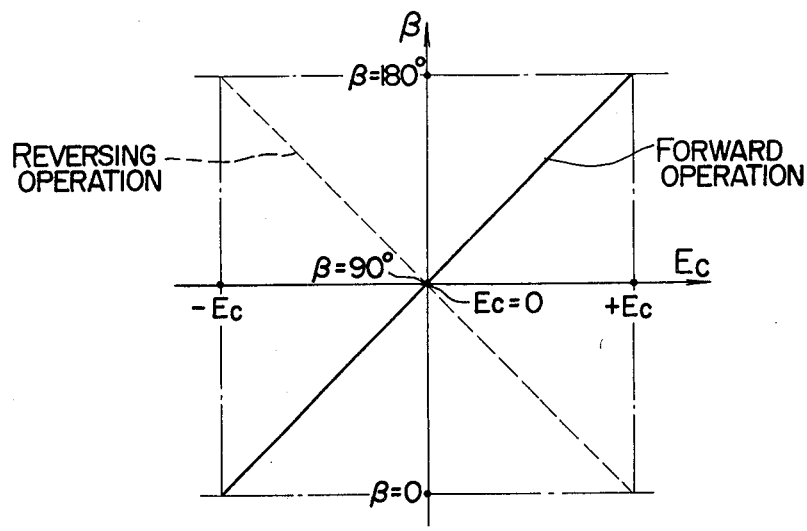
FIGS. 11a and 11b show the phase-shifting characteristics of the control system according to the present invention.
Figure 11B:
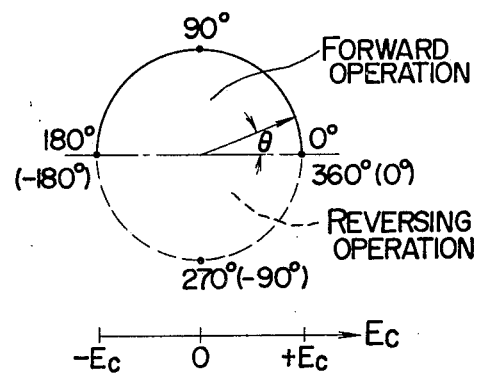

The phase-shifting characteristics are shown in FIG. 11. The leading angle of 180 degrees is in phase with the lagging angle of 180 degrees. Therefore, in transferring from forward regenerative operation to reverse motoring operation, the angle of advance β automatically changes from 180 to 0 degree if the phase control signal $E_C$ is set at its positive maximum. When transferring from the reverse regenerative operation to the forward motoring operation, on the other hand, the angle of advance β automatically changes from 180 to 0 degree if the phase control signal $E_C$ is set at the negative maximum. Thus, without changing the combination of the position signals, continuous alternate application of negative and positive phase control signals $E_C$ enables stable switching of the operation modes.

Figure 12:
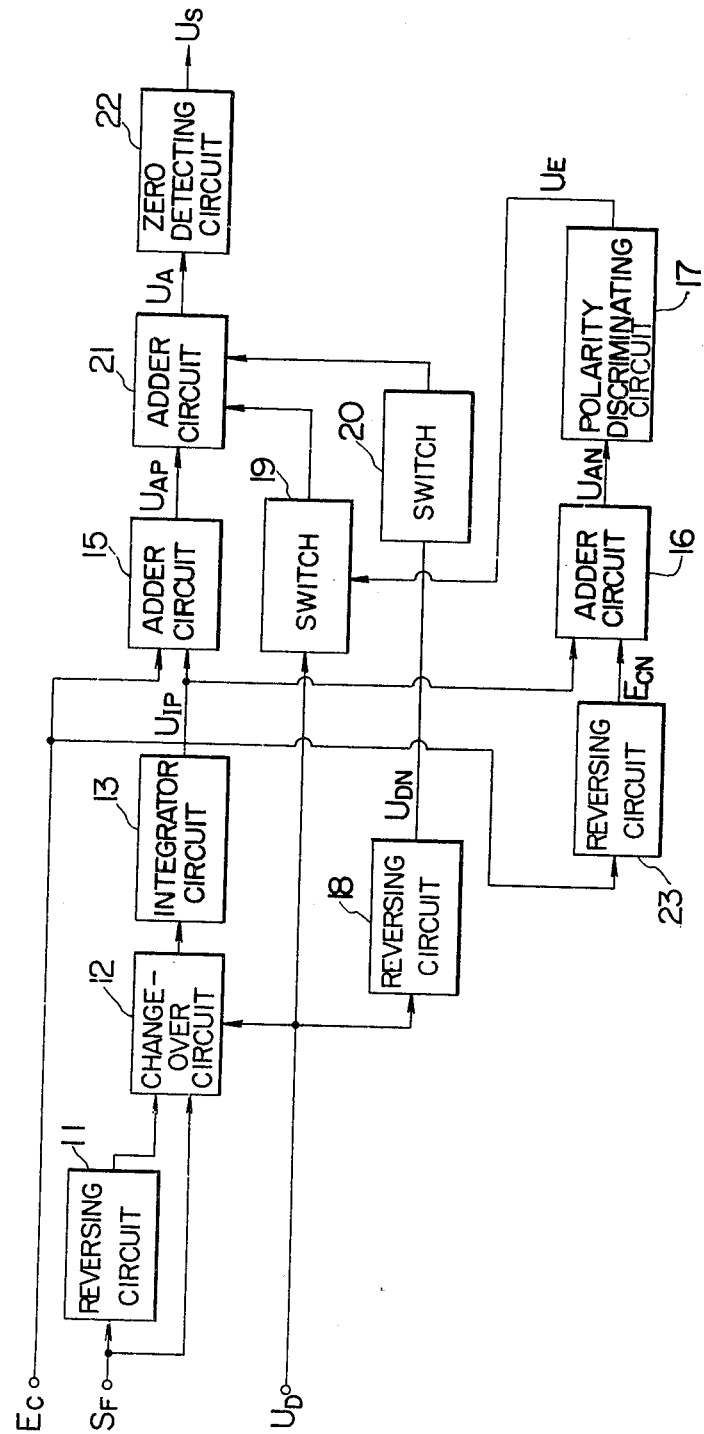
FIG. 12 is a diagram showing another detailed construction of the phase-shifting circuit.
Figure 13:
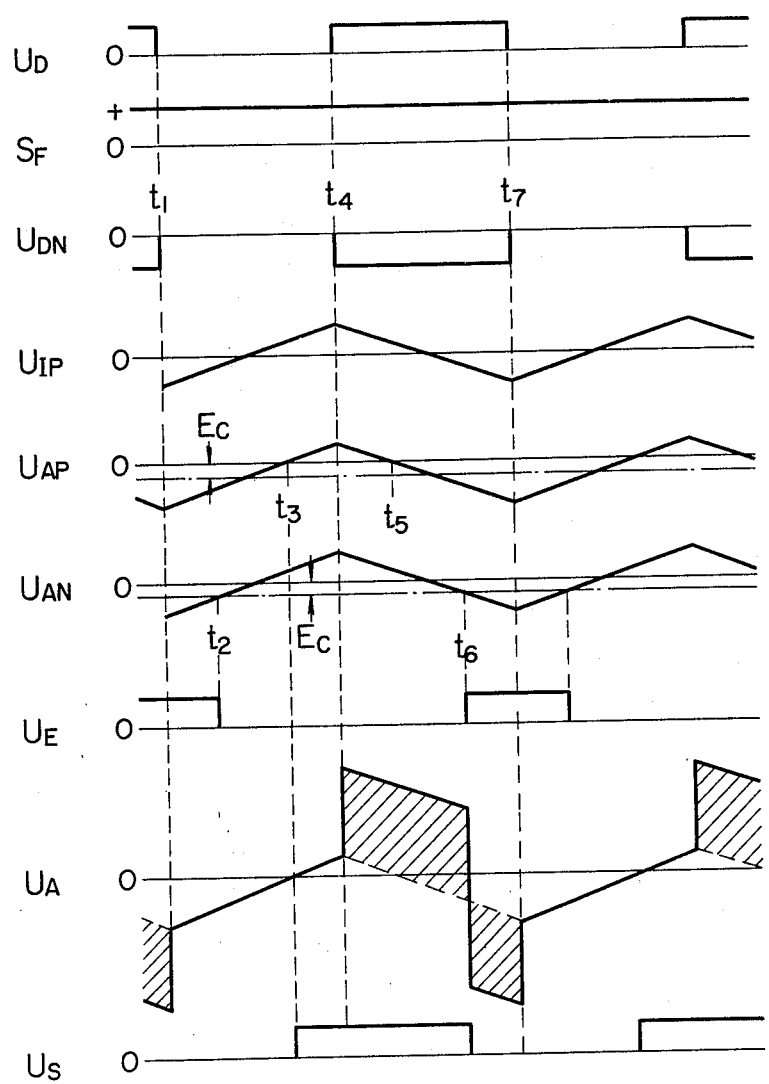
FIG. 13 is a time chart for explaining the operation of the phase-shifting circuit shown in FIG. 12.

Another embodiment of the present invention is illustrated in FIG. 12. The integrated signal $U_{IP}$, and the phase control signal $E_C$, after being reversed in polarity by the reversing circuit 23, are applied to the adder circuit 16. In the embodiment under consideration, the polarity-discriminating circuit 17 produces the signal $U_E$ in the state of "1" during the negative period of the signal $U_{AN}$. A time chart corresponding to FIG. 5 for the forward operation is shown in FIG. 13. It is seen that the phase-shifted position signal $U_S$ of the phase angle θ corresponding to the phase control signal $E_C$ is produced. Thus, as in the embodiment of FIG. 4, the operation mode may be changed by the phase control signal $E_C$.

It will be understood from the foregoing description that according to the present invention, the operation mode is changed by changing the polarity and magnitude of the phase control signal $E_C$, thereby making possible stable control.

Instead of producing the speed signal by the DC tachogenerator as explained above, an AC tachogenerator may be used with converting its AC output signal into a DC signal and with reversing the polarity of the DC signal. The polarity of the DC signal may be reversed by detection of the phase rotation.

The above-mentioned embodiments are concerned with the case in which the frequency converter converts the direct current into the alternating current. In place of such a system, a cyclo-converter for converting the alternating current directly into another alternating current may of course be used for the purpose of control.

I claim:

1. In a control system for a commutatorless motor, comprising a synchronous motor having a polyphase armature winding and a field winding, a frequency converter for supplying AC current of variable frequency to said armature winding, a speed detector for detecting the rotational speed of said synchronous motor and for producing a speed signal different in polarity depending on the rotational direction of said motor, and a position detector means for detecting a position signal based on the rotational speed of said synchronous motor; the improvement comprising phase-shifting circuit means including integrator circuit means for integrating said speed signal in synchronism with said position signal and adapted to shift the phase of said position signal by the maximum of 180 degrees both in the lead and lag direction in response to a phase control signal and an integrated signal delivered from said integrator circuit means, and logic circuit means supplied with a phase-shifted position signal delivered from said phase-shifting circuit means and including reversing circuit means for producing a reverse phase-shifted position signal resulting from reversing in polarity the phase-shifted position signal, said logic circuit means generating a firing pulse for said frequency converter in accordance with a combination of a phase-shifted position signal and a reverse phase-shifted position signal.

2. A control system according to claim 1, in which said integrator circuit means produces a triangular wave signal synchronized with one cycle of said position signal and adapted to be reversed in phase depending on the direction of rotation of said motor, said triangular wave signal having a fixed amplitude; said phase-shifting circuit means further including first adder means for producing the sum of and difference between said integrated signal of said integrator circuit and said phase control signal, addition control means for delivering one of said position signal and said reverse position signal for a period during which said difference is higher than a predetermined level and delivering the other of said position signal and said reverse position signal for a period during which said difference is lower than the predetermined level, second adder means for adding said sum to the delivered output of said addition control means, and a zerodetecting circuit for producing an output signal during the period when the output signal of said second adder means is higher than a predetermined level.

3. A control system according to claim 2, in which said first adder means includes a first adder circuit for adding said integrated signal to said phase control signal, and a second adder circuit for adding a reversed signal of said integrated signal to said phase control signal.

4. A control system according to claim 2, in which said first adder means includes a first adder circuit for adding said integrated signal to said phase control signal, and a third adder circuit for adding said integrated signal to a reversed signal of said phase control signal.

5. A control system according to claim 1, in which said speed detector is a DC generator coupled mechanically to said synchronous motor.

6. A control system according to claim 1, wherein said position detector means detects a position signal for each phase of said polyphase winding, said phase-shifting circuit means providing a phase-shifted position signal for each phase position signal, and said logic circuit means including said reversing circuit means producing a reverse phase-shifted position signal for each phase-shifted position signal, said logic circuit means generating a firing pulse in accordance with a combination of a phase-shifted position signal of one phase and a reverse phase-shifted position signal of another phase.

7. A control system according to claim 6, wherein said polyphase winding is a three phase winding and said position detector means detects first, second and third phase position signals, said phase shifting means providing first, second and third phase-shifted position signals, and said logic circuit means providing first, second and third reverse phase-shifted position signals, said logic circuit means generating firing pulses in accordance with a combination of a phase-shifted position signal of the first phase and a reverse phase-shifted position signal of the second phase, a phase-shifted position signal of the second phase and a reverse phase-shifted signal of the first phase, a phase-shifted position signal of the second phase and a reverse phase-shifted position signal of the third phase, a phase-shifted position signal of the third phase and a reverse phase-shifted position signal of the second phase, a phase-shifted position signal of the third phase and a reverse phase-shifted position signal of the first phase, and a phase-shifted position signal of the first phase and a reverse phase-shifted position signal of the third phase.

* * * * *